United States Patent
Strenglein

[15] 3,694,803
[45] Sept. 26, 1972

[54] VEHICLE TIRE PRESSURE MONITOR SYSTEM

[72] Inventor: Harry F. Strenglein, Clearwater, Fla.

[73] Assignee: Sperry Rand Corporation

[22] Filed: July 28, 1971

[21] Appl. No.: 166,892

[52] U.S. Cl. ................................340/58, 340/224
[51] Int. Cl. ...............................B60c 23/02
[58] Field of Search.....340/58, 224, 227, 227.1, 229; 325/111, 117, 118

[56] References Cited

UNITED STATES PATENTS

| | | |
|---|---|---|
| 2,274,557 | 2/1942 | Morgan et al.........340/58 UX |
| 2,818,732 | 1/1958 | Bennett..................340/227 R |
| 2,958,781 | 11/1960 | Marchal et al......325/118 UX |
| 3,092,806 | 6/1963 | Field............................340/58 |

*Primary Examiner*—Alvin H. Waring
*Attorney*—S. C. Yeaton

[57] ABSTRACT

The condition monitor provides information as to the state of a monitored dual state device having, for example, possible satisfactory and unsatisfactory conditions. Use is made of a passive transducer element powered by a space-transmitted radio frequency signal of fundamental carrier frequency. In the unsatisfactory condition of the monitored device, the passive transducer emits a signal that is a harmonic of the carrier frequency, which signal is detected for the operation of a suitable alarm or remedial control. In the normal or satisfactory condition of the monitored device, the carrier frequency energy causes the passive transducer to inhibit production of second harmonic energy.

19 Claims, 9 Drawing Figures

PATENTED SEP 26 1972 3,694,803
SHEET 1 OF 2

INVENTOR
HARRY F. STRENGLEIN
BY
H P Ferry
ATTORNEY

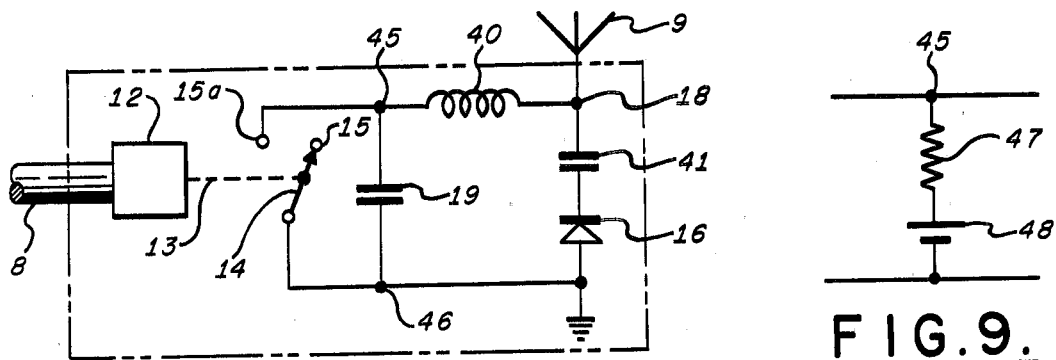
FIG. 6.
FIG. 9.
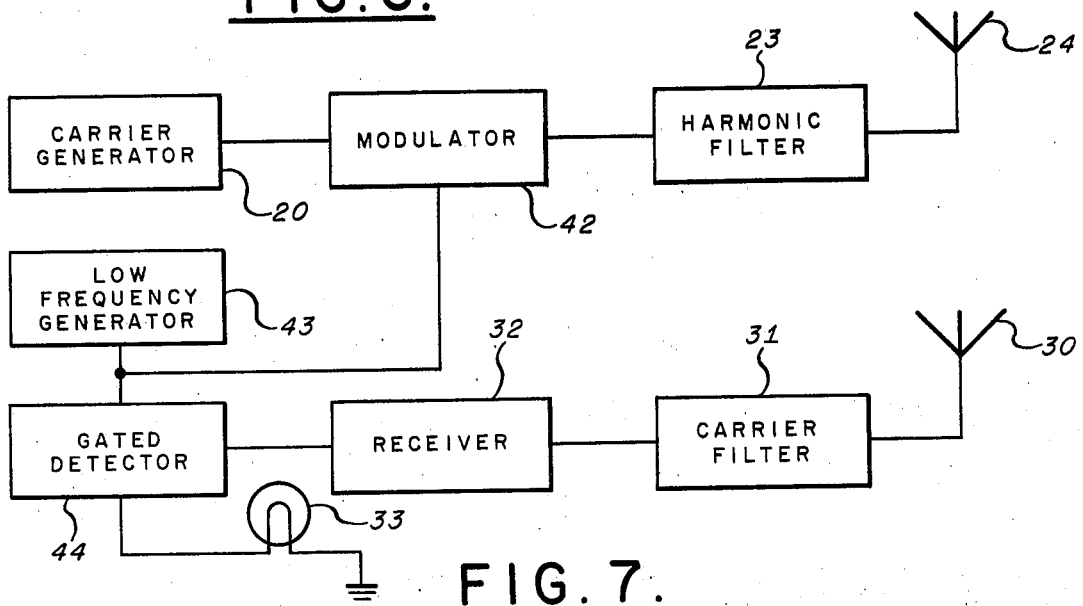
FIG. 7.
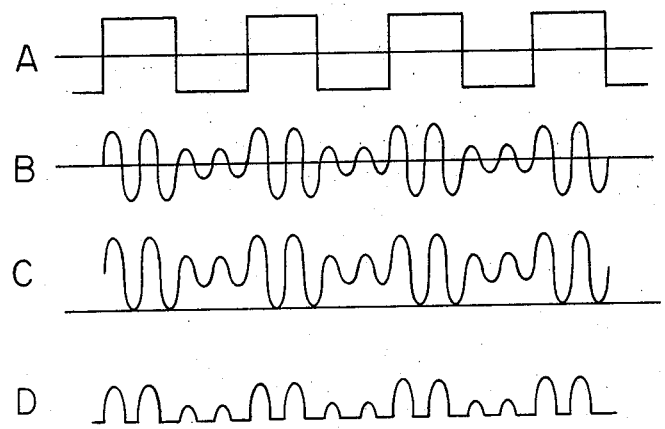
FIG. 8.
INVENTOR
HARRY F. STRENGLEIN
BY
HP Terry
ATTORNEY

VEHICLE TIRE PRESSURE MONITOR SYSTEM

BACKGROUND OF THE INVENTION

1. Field of the Invention

The invention pertains to condition monitoring means for indicating the state of a dual state device and more particularly for indicating the condition of a monitored device within or upon which a passive transducer is itself mounted and without any requirement of physical elements for directly conducting a supply of electrical power to the transducer. An abnormal state of the monitored device is indicated by the radiation of a harmonic signal by the passive transducer.

2. Description of the Prior Art

There has been a general need in the past for means for evaluating a condition or conditions of elements of rotating or translating machinery in an inexpensive and efficient manner. Prior art solutions to the problem have generally been complex, since electrical or other power must be supplied from a reliable source to the moving monitoring device by slip rings or some other such agency, Further, the condition monitor output signal must similarly be coupled from the moving machinery element back to a relatively stationary location for providing an alarm to be acted upon by an operator or for direct operation of an automatic control.

For example, large trucks and other such vehicles, which may have as many as twelve tires, and their cargoes are seriously endangered if one of the vehicle tires becomes underinflated. Such a condition not only leads to rapid tire wear, but rapid heating of the tire body may cause it to ignite, and even that condition may not be noticed immediately by the truck operator. Such fires are notoriously stubborn fires, and may result in the total loss of the vehicle and valuable cargo.

Prior art devices responsive, for example, to tire pressure have included a variety of electrical and mechanical devices for signalling to the truck operator or to other personnel any departure in tire pressure from normal. As suggested above, these devices have required slip ring or equivalent systems to supply power to the pressure monitoring device, and additional such elements to deliver the monitor output signal for use by the truck operator. Such devices wear very rapidly and are highly unreliable under all but most ideally clean and dry roadway conditions. Also unsatisfactory are arrangements responsive to tilting of a wheel or axle due to loss of pressure in a tire. Such devices are undesirably responsive both to the cross section of the roadway and to the load distribution within the vehicle.

It will be appreciated by those skilled in the art of monitoring the operating conditions of kinetic elements of other types of machines that kindred problems arise in many different types of such machines that are not adequately solved by existing condition monitoring equipment. Therefore, there is similarly present a need for providing efficient and effective monitoring apparatus for various types of kinetic elements associated with various kinds of machines for monitoring their various operating characteristics, such as pressure, speed, acceleration, and the like.

SUMMARY OF THE INVENTION

The present invention relates to condition monitoring apparatus for providing information as to the state of a dual state device having, for example, a satisfactory condition and a possible unsatisfactory condition. According to the invention, the condition monitor provides an indication of the condition of the monitored device by employing a passive transducer attached directly to the device to be monitored. The novel transducer does not require the use of certain prior art physical elements, such as for conducting an electrical current for supplying power to the transducer. Where, for example, tire pressure is to be monitored, use is made of a pressure transducer powered by a space-transmitted radio frequency signal of fundamental carrier frequency supplied by a remotely located generator. In the unsatisfactory condition of the monitored device, such as in the instance of a low tire pressure condition, the passive transducer emits a signal that is a harmonic of the incident carrier frequency signal, which harmonic signal is detected for the actuation of an alarm or for the operation of a suitable control device.

BRIEF DESCRIPTION OF THE DRAWINGS

FIG. 6 is a wiring diagram of an alternative form of the transducer of FIG. 3.

FIG. 7 is a block diagram of a signal transmitter and receiver for use with the transducer apparatus of FIG. 6.

FIG. 8 is a series of graphs of signal wave forms useful in explaining the operation of the apparatus of FIGS. 6 and 7.

FIG. 9 is a wiring diagram of a circuit which may be substituted in the circuit of FIG. 6.

DESCRIPTION OF THE PREFERRED EMBODIMENTS

Figure 1:
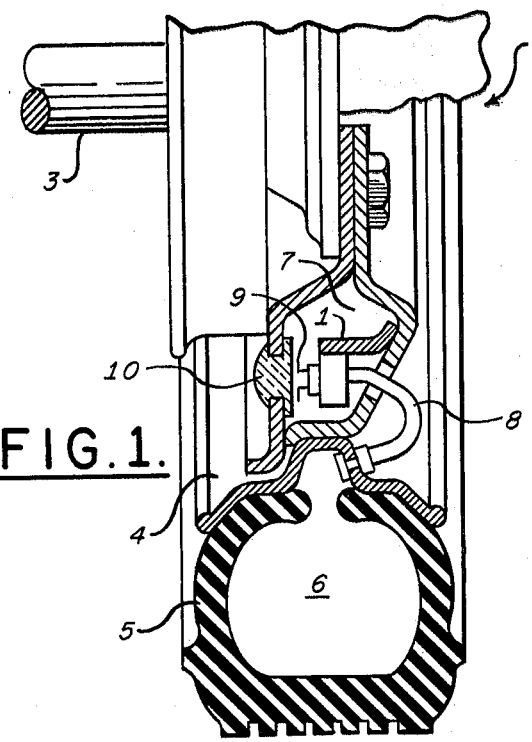
FIG. 1 is an elevation view, partly in cross section, of apparatus employing the novel condition monitor.

In FIG. 1, the novel transducer 1 of the present invention is employed for monitoring a condition of a rotating machine element in the form of a wheel and tire assembly 2, such as may be employed in a vehicle for hauling freight cargoes. The axle 3, wheel 4, and tire 5 of assembly 2 may be substantially conventional elements. While it will be understood by those skilled in the art that the present invention has many applications, it is illustrated in FIG. 1 in an environment in which it monitors the gas pressure level within the interior 6 of vehicle tire 5. For this purpose, the transducer 1 is conveniently supported in an interior region 7 of the wheel 4. Since it is to monitor the interior gas pressure condition of tire 5, transducer 1 is coupled through a tubular coupling 8 connecting the transducer 1 to the interior 6 of tire 5. If desired, the tubular coupling 8 may be attached to a tee adapter fitted on the conventional tire valve stem of tire 5.

In FIG. 1, transducer 1 is arranged to transmit a high frequency signal emitted by antenna 9 when the gas pressure within tire 5 reaches an unsatisfactory low condition. Antenna 9 is illustrated, for purposes of convenience in the drawing, as a simple dipole antenna, though it will be understood by those skilled in the art that other kinds of high frequency antennas may be employed for the purpose. When antenna 9 is, for instance, emitting signals that are transmitted outside of wheel 5 through a window 10, sealed adjacent antenna 9 at an appropriate location in wheel 4 as shown in FIG. 1, it is to be assumed that antenna 9 will be in communication with one or more cooperating antennas located, for example, in a central portion below the vehicle body with respect to its several wheels. In such a configuration, it is anticipated that the cooperating transmitter and receiver equipment illustrated in FIGS. 4 and 5 will be located aboard the vehicle.

Figure 2:
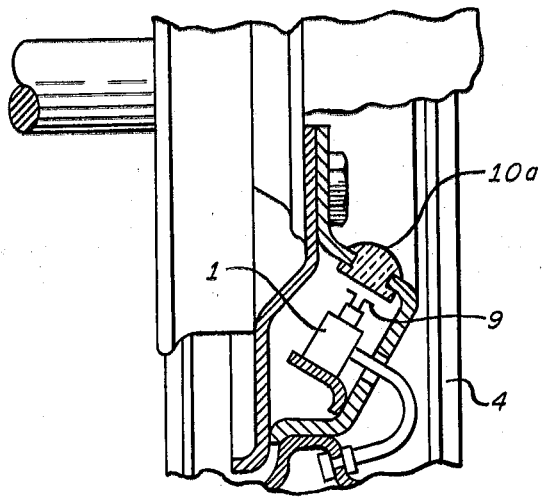
FIG. 2 is a fragmentary view of an alternative arrangement of a portion of the apparatus of FIG. 1.
Figure 4:
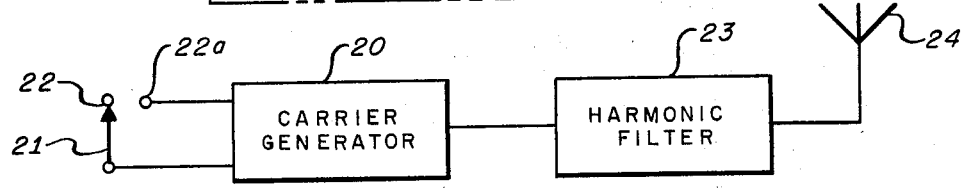
FIG. 4 is a block diagram of a signal transmitter used with the transducer of FIG. 3.
Figure 5:
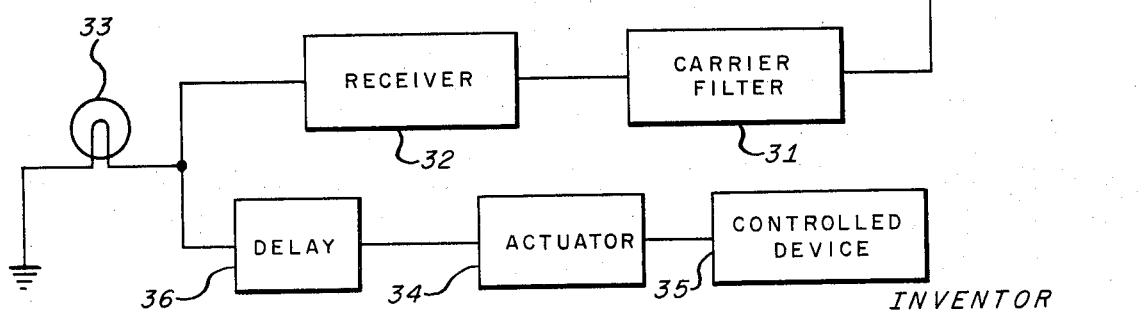
FIG. 5 is a block diagram of a signal receiver used with the apparatus of FIGS. 3 and 4.

FIG. 2 illustrates an alternative location of the transducer 1, such that its associated antenna 9 is directed to radiate or receive energy through a window 10a in an outer wall of wheel 4. In this configuration, it is expected that the transducer 1 will operate cooperatively with transmitter and receiver apparatus, again such as illustrated in FIGS. 4 and 5, but which transmitter and receiver apparatus may be located, for instance, at a road side check point or maintenance area. Such check points may be located at convenient intervals along a truck highway, for example.

Figure 3:
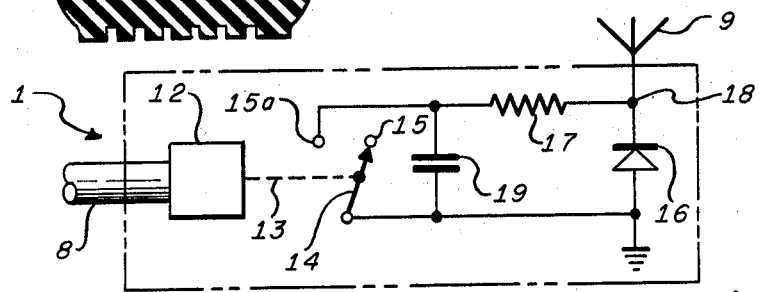
FIG. 3 is a wiring diagram of the transducer used in FIGS. 1 and 2 showing the interconnection of circuit elements.

The transducer 1 of FIGS. 1 and 2 is shown in greater detail in FIG. 3. It is seen that the tubular coupling 8 is connected to supply gas pressure to the interior of a pressure sensing switch 12 which may be of a conventional type including a deformable diaphragm or other pressure sensing element adapted for moving a mechanical link 13 to, in turn, move switch blade 14 according to the pressure within the interior of tire 5. For example, if the gas pressure within tire 5 is adequate, switch blade 14 will be in contact with the unused switch contact 15. However, if the pressure within tire 5 and consequently within the tubular coupling 8 falls below a predetermined value, motion of the pressure sensing element within sensor 12 will move switch blade 14 to the contact 15a.

The transducer 1 of FIG. 3, when switch blade 14 is touching contact 15a, includes in series circuit a diode or rectifier 16 and, if desired, a resistor 17 for providing a direct current return path for the diode current when switch 14 is closed. Coupled to junction 18 between diode 16 and resistor 17 is an antenna 9 such as shown in FIGS. 1 and 2. A by-pass condenser 19 is in effect connected between contacts 15 and 15a. Antenna 9 is simultaneously resonant to the system carrier frequency and to its second harmonic. In order that the antennas used in the system may be small, the carrier frequency will preferably be on the order of 1 to 2 gigaHertz.

As noted above, a transmitter system and a receiver system cooperate with transducer 1. The transmitter, as shown in FIG. 5, includes a signal generator 20 for generating a high frequency carrier signal. Such a signal may be generated continuously or at the will of the operator by moving switch blade 21 from contact 22 to contact 22a. For purposes which will be described, the output of generator 20 is supplied to harmonic filter 23 which rejects all harmonic frequency signals and passes only the desired carrier frequency signal to a radiator antenna 24. Antenna 24 may be tuned to the carrier frequency and may take the form of any of several known types of high frequency antennas. For example, if the transmitter system of FIG. 4 is carried on a truck whose tires are being monitored, a conventional omnidirectional antenna may be placed so that the interior sides of all wheels of the vehicle may be illuminated by its radiation. If the transmitter of FIG. 4 is to be located at a road side check station, a directional antenna may be used as antenna 24 so oriented or orientable that it illuminates, for example, the window 10a, thus exciting antenna 9 in FIG. 2.

In addition to the transmitter system of FIG. 4, the receiver system of FIG. 5 is used cooperatively with transducer 1. The receiver system of FIG. 5 includes a receiver antenna 30, which again may be omnidirectional or directive depending upon the location of the receiver system, and which is tuned to the harmonic frequency. If the transmitter and receiver system are vehicle borne, antenna 30 may be omnidirectional and mounted so that it is readily illuminated by radiation from the window 10 of FIG. 1. In a road side or other checking installation, antenna 30, like antenna 24, may be directional. Before amplification and detection, the signal received by antenna 30 is subjected to the action of carrier filter 31, which rejects the carrier signal of generator 20 and allows the passage of a particular harmonic to receiver 32. Preferably, the passed harmonic signal will be the second harmonic of the carrier signal supplied by generator 20.

Any signal received by antenna 30 is a signal indicating an unsatisfactory condition of the element being monitored. For example, in the application being discussed, the presence of such a signal indicates that the gas pressure within the interior 6 of tire 5 has fallen below a predetermined desired lower limit. Thus, any warning signal received and detected by receiver 32, which may also be tuned to the harmonic frequency, may be supplied to a visual or audible sensing device 33, such as a red light. If the signals emitted by antenna 24 are continuous wave signals, lamp 33 may be an incandescent lamp. Where pulsed transmissions are employed, a gas discharge lamp such as a neon or argon lamp may be used. It is further within the scope of the invention that such a monitoring signal may also be supplied to an appropriate actuator to exercise remedial control over the adverse situation. For example, in the instance of a pneumatically tired vehicle, actuator 34 may cause operation of a control device such as a conventional hydraulic braking system or other controlled device 35. If desired, a suitable time delay 36 may be injected in the circuit before actuator 34, giving the operator time to take corrective measures, if he is able to do so, before automatic control is exercised.

In operation, transducer 1 may be continuously interrogated or may be interrogated at the will of the operator. As will be understood from the foregoing, transponder 1 is interrogated by directing high carrier frequency energy from antenna 24 toward antenna 9 for its interception thereby. If the gas pressure within the interior 6 of tire 5 is normal or above a predetermined safe lower limit, switch 14 remains open with its blade lying on contact 15. The carrier frequency signal is then received by antenna 9 and is detected by diode 16 and a rectified voltage consequently builds up across by-pass condenser 19. Diode 16 is selected to have non-linear resistance characteristics, but substantially no harmonic energy is generated as long as switch 14 remains open or non-conducting. Thus, to a substantial degree, no harmonic energy is radiated by antenna 9 in the normal gas pressure condition of tire 5.

If the transmitter of FIG. 4 continues to cause transmitter antenna 24 to radiate carrier frequency energy and if the gas pressure of the interior 6 of tire 5 falls below the predetermined minimum safe value, a direct current return path for diode 16 will be completed by switch 14 having been transferred to contact 15a. Thus, as long as the interrogation signal from antenna 24 persists, the rectified output of diode 16 flows through the completed direct current return path and the aforementioned non-linear characteristic of diode 16 causes the generation of a second harmonic energy. Such second harmonic energy is coupled from transducer 1 and is radiated by antenna 9 in the direction of antenna 30 of the receiver system shown in FIG. 5, as noted previously. Such harmonic energy signals, indicating an unsatisfactory low gas pressure condition of tire 5 or a malfunction or an unsatisfactory condition of other apparatus with which the invention may be used, pass through carrier filter 31 for amplification and detection in receiver 32. As indicated previously, a useful output is formed by receiver 32 for the operation of an alarm 33 or of an actuator 34.

FIGS. 6 and 7 illustrate an alternative and generically similar form of the novel condition monitor wherein a modulation arrangement is advantageously employed. Where the transducer is remotely located from the transmitter-receiver apparatus, or where it is convenient to move the transmitter-receiver relative to the transducer, as in the instance of situations requiring the use of portable rather than relatively fixed equipment, the arrangement of FIGS. 6 and 7 is of particular interest.

In the alternative transducer 1a of FIG. 6, many of the components are used again generally as they were used in the transducer of FIG. 3. Accordingly, such elements are identified in both figures with similar reference numerals, including tubular coupling 8, antenna 9, pressure sensing switch 12, mechanical link 13, switch blade 14, switch contacts 15 and 15a, diode or rectifier 16, and by-pass condenser 19. The resistor 17 of FIG. 1 is replaced, however, by inductance 40, and a capacitor 41 is placed between antenna 9 and diode 16.

Thus, any amplitude modulated high frequency signal received by antenna 9 finds a path available that is provided with a filter network comprising elements 40 and 41 for providing a continuous high frequency signal path to ground. Also, a circuit through inductance 40 is provided for carrying only the direct current produced by rectifier diode 16 in the presence of high frequency signals. Condenser 19 is placed in that direct current path; condenser 19 is sufficiently large as to hold peak voltages produced at the peaks of the amplitude modulation imposed on the high frequency carrier. Switch 14, whose state is to be sensed, is placed across condenser 19.

The transducer of FIG. 6 cooperates with or is interrogated by a receiver-transmitter system of the kind shown in FIG. 7, wherein suitably amplitude modulated carrier transmissions are generated. In FIG. 7, several of the circuit components are again generally similar to those used in the separate transmitter and receiver units shown in the respective FIGS. 4 and 5 and are therefore identified by similar reference numerals. These include carrier generator 20, harmonic filter 23, radiating antenna 24, receiver antenna 30, carrier filter 31 for passing harmonic signals, receiver 32, and indicator 33, which may be an alarm or actuator device, as before.

The output of carrier generator 20 in FIG. 7 is supplied to a conventional amplitude modulator 42 before it is, in turn, supplied to the carrier signal passing filter 23 for radiation by antenna 9. Amplitude modulator 42 is driven by the output of a conventional low frequency square wave generator 43, which latter produces wave A of FIG. 8. Thus, a carrier signal that is amplitude modulated at a low frequency is transmitted by antenna 24 to antenna 9 of the transducer 1a of FIG. 6. The radiated carrier has the general appearance of wave B OF FIG. 8, where it is to be understood that the high frequency cycle length is greatly exaggerated for purposes of simplicity in the drawing.

Any harmonic signal broadcast by the transducer antenna 9 is received by the receiver antenna 30. Only the desired harmonic signal is permitted to pass through carrier filter 31 to the tuned receiver 32 for detection. Detection is performed by a conventional gated detector 44, gated detector 44 being synchronously controlled along with amplitude modulator 42 by low frequency generator 43. The gated output of detector 44 is used to actuate warning indicator 33 or to control other alarm or control devices.

The structure and principles of operation of the invention will be understood from the foregoing description. It will be seen that if the switch blade 14 of the transducer 1a is closed (at contact 15a), no charge can build up on the plates of condenser 19 and the high frequency signal impressed across diode 16 is an alternating signal with no unidirectional component. The rectification function of diode 16 yields considerable harmonic energy, the harmonic signal amplitude more or less following the carrier modulation wave form. The wave form across diode 16 with switch 14 closed is that of wave D of FIG. 8.

On the other hand, if switch blade 14 is open (at contact 15), condenser 19 will charge to a voltage level corresponding to the power received by antenna 9 at the peak of the modulation cycle. There being no significant direct current return path in this condition, condenser 19 will substantially retain the charge over the entire modulation cycle. The wave form across diode 16 is similar to wave C of FIG. 8 when switch 14 is open.

Operation benefits by the fact that the effective capacitance of the junction of semiconductor diode 16 varies approximately as the reciprocal of the square root of the voltage across the diode junction. Thus, the capacitance variation at the low level troughs of the amplitude modulation cycle, when superimposed on the high stored unidirectional voltage remaining from the crest of the amplitude modulation cycle, is relatively trivial. Harmonic generation by transducer 1a is then desirably low. On the other hand, efficient harmonic generation obtains when such is really desired; i.e., when the switch blade 14 is on contact 15a, thus placing a short circuit across condenser 19.

The transducer arrangements of FIGS. 3 and 6 are preferred because neither requires the use of a battery or other bias source. It is possible, however, where use of a small battery is not ruled against, to employ the circuit of FIG. 9. It is used by disconnecting condenser 19 from junctions 45 and 46 in FIG. 6 and by inserting the resistor 47 and battery 48 in place of condenser 19. In this case the small battery 48 supplies the unidirectional voltage necessary to inhibit harmonic generation when it is not desired. Diode 16 can readily be selected to have a high backward flow resistance and resistor 47 can have a relatively large resistance, so that battery 48 can have a desirably long life generally approaching its normal shelf life. Should battery 48 approach exhaustion, an alarm presentation will automatically be generated; though such a response is a spurious one, it is a fail-safe response rather than an unnoticed response which simply disables transponder 1a.

It will be evident to those skilled in the art that a novel transducer system may be realized using various modifications of the arrangements illustrated in the several figures. For example, antennas 24 and 30 in either form of the invention may be replaced by a single broad band antenna. Receiver 32 may take any of several forms; for example, a crystal video, a tuned radio frequency, a superregenerative or a superheterodyne receiver may be employed. It will furthermore readily be observed by those skilled in the art that forms of the system may be successfully demonstrated using either pulsed or continuous wave transmissions.

It is seen that the novel condition monitor may be used in a wide variety of situations to provide information as to the satisfactory or unsatisfactory state of a monitored device. The versatility of the concept is illustrated by the fact that it may be used continuously or intermittently to monitor the condition of stationary or of moving elements of apparatus. It may be incorporated in total as a permanent part of such equipment, or may be used with portable test facilities or with facilities such as may be located along a route of a vehicle, for example. In particular, it provides means for evaluation of the condition or conditions of elements of rotating or translating machinery in an inexpensive and efficient manner.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Apparatus for monitoring the condition of a device having first and second possible conditions comprising:
    switch means having first and second states,
    sensor means responsive to said first or said second conditions of said device for placing said switch means in said first or in said second state,
    transducer means adapted to be excited by carrier frequency signal energy and comprising rectifier means, and circuit means including said switch means in series relation with said rectifier means for generating a signal at a harmonic of said carrier frequency when said switch is in said first state, and
    means coupled to said circuit means for radiating said harmonic signal.

2. Apparatus as described in claim 1 wherein said means for radiating said harmonic signal comprises antenna means adapted also to receive said carrier frequency signal.

3. Apparatus as described in claim 2 additionally including signal generator means for radiating carrier frequency signals for exciting said antenna means.

4. Apparatus as described in claim 2 additionally including receiver means for receiving said harmonic signal, said receiver means comprising:
    second antenna means,
    receiver-detector means coupled to said second antenna means, and
    means for utilizing the output of said receiver-detector means.

5. Apparatus as described in claim 4 wherein said utilization means comprises alarm means.

6. Apparatus as described in claim 5 wherein said utilization means comprises actuator means for operating remedial control means.

7. Apparatus as described in claim 4 wherein said second antenna means is tuned substantially to the frequency of said harmonic signal.

8. Apparatus as described in claim 4 additionally including filter means for passing substantially said harmonic signal from said second antenna means to said receiver-detector means.

9. Apparatus as described in claim 1 wherein said sensor means comprises a pressure sensor.

10. Apparatus as described in claim 1 wherein said switch means, said sensor means, and said transducer means are mounted upon a movable element.

11. Apparatus as described in claim 10 wherein said movable element comprises a wheel rotatable about an axis.

12. Apparatus as described in claim 11 wherein said switch means, said sensor means, and said transducer means are mounted within an interior region of said wheel.

13. Apparatus as described in claim 12 including window means comprising part of said wheel for permitting said transducer means to receive said carrier frequency signal energy and to transmit said harmonic signal.

14. Apparatus as described in claim 13 additionally including:
    a pneumatic tire mounted upon said wheel, and
    gas conduction means for connecting the interior of said tire to said sensor.

15. Apparatus as described in claim 1 wherein said circuit means comprises in series connection with said rectifier means:
    resistor means, and
    capacitive means,
    said capacitive means being coupled across said switch means,
    said resistor means and said rectifier means having a common junction, said common junction being adapted to be coupled to antenna means.

16. Apparatus as described in claim 15 wherein said circuit means comprises in series connection with said rectifier means:
first capacitive means,
inductive means, and
second capacitive means,
said second capacitive means being coupled across said switch means,
said first capacitive means and said inductive means having a common junction therebetween,
said common junction being adapted to be coupled to antenna means.

17. Apparatus as described in claim 1 additionally comprising:
generator means for generating carrier frequency signal energy,
modulation signal generator means, and
modulator means for amplitude modulating said carrier frequency signal energy in response to said modulation signal generator means.

18. Apparatus as described in claim 17 additionally comprising:
receiver means for responding to said radiated harmonic signal for producing an output,
gated detector means responsive to said modulator means for detecting said receiver means output, and
means for utilizing the output of said gated detector means.

19. Apparatus for monitoring the condition of a device having first and second possible conditions comprising:
switch means having first and second states,
sensor means responsive to said first or said second conditions of said device for placing said switch means in said first or in said second state,
transducer means adapted to be excited by carrier frequency signal energy and comprising rectifier means,
circuit means including said switch means in series relation with said rectifier means for modifying said carrier frequency signal energy when said switch is in said first state, and
means coupled to said circuit means for radiating said modified carrier frequency signal energy.

* * * * *